United States Patent [19]
Albaric et al.

[11] 3,916,230

[45] Oct. 28, 1975

[54] LIQUID-COOLED ROTOR FOR DYNAMOELECTRIC MACHINES

[75] Inventors: Jacques E. Albaric, Pittsburgh; Charles W. Burkhart, North Huntingdon; Warren W. Jones, Acme, all of Pa.

[73] Assignee: Westinghouse Electric Corporation, Pittsburgh, Pa.

[22] Filed: June 17, 1974

[21] Appl. No.: 480,076

[52] U.S. Cl. .............................................. 310/61
[51] Int. Cl.² .......................................... H02K 1/32
[58] Field of Search ............ 310/52, 54, 55, 57, 58, 310/59, 60, 64, 61, 71; 339/278; 336/107, 192

[56] References Cited
UNITED STATES PATENTS

| | | | |
|---|---|---|---|
| 3,131,321 | 4/1964 | Gibbs | 310/64 |
| 3,469,125 | 9/1969 | Kranz | 310/64 |
| 3,543,062 | 11/1970 | Banchieri | 310/64 |
| 3,543,063 | 10/1970 | Agerman | 310/64 |
| 3,733,502 | 5/1973 | Curtis | 310/61 |
| 3,818,256 | 6/1974 | Ying | 310/64 |

*Primary Examiner*—R. Skudy
*Attorney, Agent, or Firm*—G. M. Medwick

[57] ABSTRACT

In a liquid-cooled rotor for large dynamoelectric machines such as turbine generators, electrical connection to the rotor winding is made by longitudinal leads extending from the winding along the rotor shaft. These longitudinal leads are connected by radial leads to axial conductors extending through the bore of the shaft for connection to an exciter or other external source of excitation current. The longitudinal leads extending from the radial leads to the rotor winding are cooled by circulation of a coolant liquid such as water through passages in the leads, the coolant liquid being supplied from the same coolant distribution chamber which supplies liquid to the conductors of the rotor winding. The radial leads are preferably also cooled by circulation of the same coolant liquid which cools the longitudinal leads.

5 Claims, 8 Drawing Figures

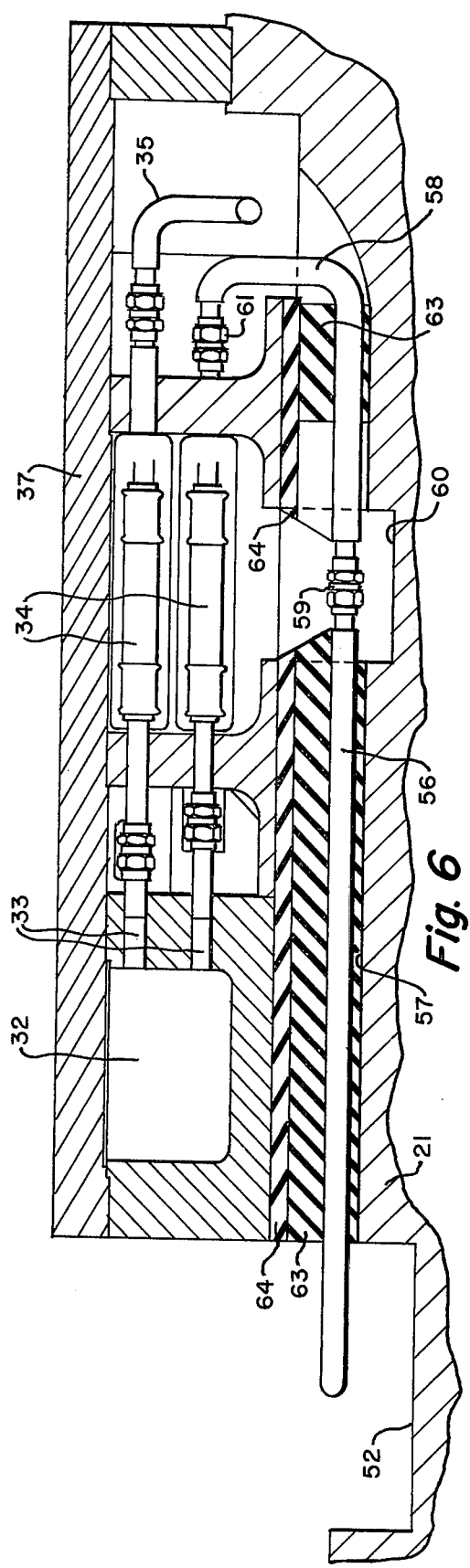
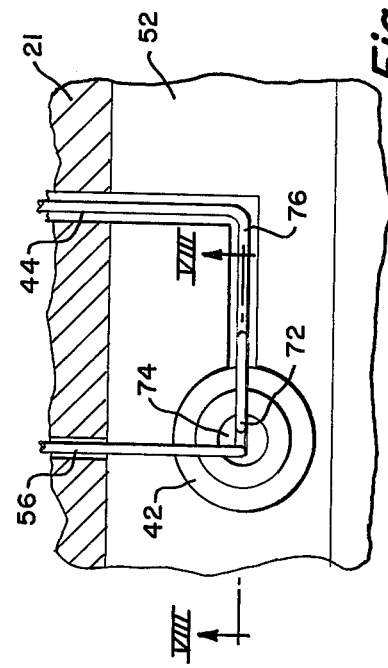
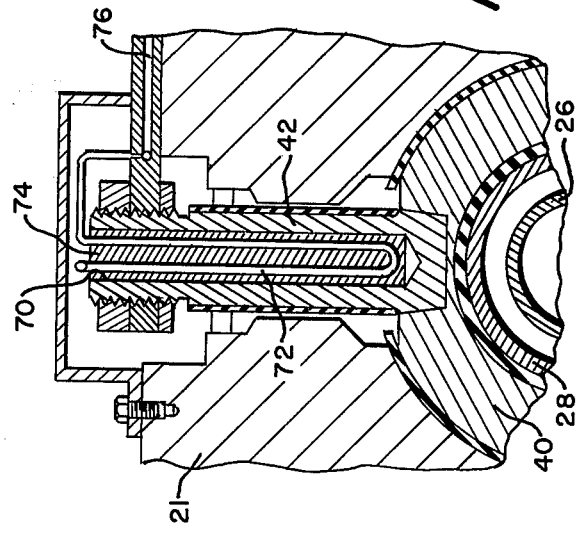

LIQUID-COOLED ROTOR FOR DYNAMOELECTRIC MACHINES

BACKGROUND OF THE INVENTION

The present invention relates to large dynamoelectric machines, such as turbine generators, and more particularly to liquid-cooled rotors for such machines.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system which has made it possible to attain very high ratings for large generators. The coolant fluid used in these machines heretofore has usually been hydrogen which fills the gas-tight housing and is circulated through the ducts of the stator and rotor windings and through radial or axial ducts in the stator core. As further increases in the maximum capacities of these large generators have become necessary, further improvements in cooling have been required and have been obtained by the use of more efficient coolant fluids such as liquids. A very considerable improvement in cooling has been obtained in this way by circulating a liquid coolant such as water through the ducts of the stator winding, and a substantial further improvement can be obtained by similarly circulating a coolant liquid through the rotor winding ducts.

Coolant liquid, such as water, is preferably supplied to the rotor of a large generator, and discharged therefrom, through the shaft bore so that the sealing problem can be minimized by introducing and discharging the liquid at locations of minimum radius where the centrifugal force on the liquid is at a minimum. When the liquid is thus introduced through the shaft, it flows from the bore through radial passages to an annular distribution chamber on the surface of the rotor from which it can be distributed to the conductors of the rotor winding through suitable tubes or hydraulic connectors. After flowing through the rotor conductors, the heated coolant may flow through similar tubes and passages at the opposite end of the rotor and be discharged through a central bore at that end, or it may return to the same end at which it entered to be discharged. Arrangements of this general type are shown, for example, in patents to Curtis et al U.S. Pat. No. 3,733,502, Gibbs et al U.S. Pat. No. 3,131,321, and in a copending application of F. P. Fidei et al Ser. No. 444,582, filed Feb. 21, 1974, and assigned to the assignee of the present invention.

In this type of construction for water-cooled rotors, the electrical connections to the rotor winding are made in essentially the conventional manner. That is, axial conductors extend through the shaft bore to the end of the shaft for connection to corresponding conductors in an exciter shaft, or to other sources of direct current excitation. Inside the machine, longitudinal leads or conductors extend from the rotor winding along the rotor shaft and are connected to the axial conductors in the shaft bore by means of radial leads extending through the shaft into the axial conductors. This arrangement is very well suited for liquid-cooled rotors in which coolant liquid is also brought into the machine, and preferably discharged therefrom, through the shaft bore where it has some cooling effect on the axial conductors.

In order to take full advantage of the improvement provided by liquid cooling of the rotor winding conductors, however, the longitudinal leads which connect the windings to the radial leads should also be cooled by circulation of coolant liquid so as to enable them to carry the maximum field current made possible by liquid cooling of the winding conductors. Preferably, the radial lead should also have some additional cooling although this may be less critical because of the relatively large size of the radial lead. In the type of construction shown in the above-mentioned Curtis et al patent, the radial lead is close to the rotor windings and is disposed between the windings and the coolant distribution chamber. In this construction, therefore, the longitudinal lead is relatively short and terminates in a location where liquid can be taken directly from the coolant distribution chamber through a coolant tube to the axial lead in the same manner as coolant is supplied to the winding conductors. The construction of the copending Fidei et al application, however, is preferable in many cases because it makes it possible for the liquid to be introduced into the machine and discharged therefrom at the same end. In this type of construction, the radial lead is more remote from the windings and is on the opposite side of the distribution chamber. The longitudinal lead, therefore, is relatively longer and must extend past the coolant distribution chamber so that the relatively simple and direct cooling arrangement of the Curtis et al patent cannot be used.

SUMMARY OF THE INVENTION

The present invention provides a construction for effectively cooling the longitudinal leads to the rotor windings in a liquid-cooled rotor and for also cooling the radial leads.

In accordance with the invention, each of the two longitudinal leads extends from the rotor winding through a slot in the surface of the shaft portion of the rotor, and extends under the annular coolant distribution chamber to the radial lead which is located on the opposite side of the coolant chamber from the windings. The coolant from the distribution chamber is distributed to the rotor windings through insulating connections to coolant tubes which are connected to the distribution chamber on the side thereof facing the windings. In accordance with the present invention, each longitudinal lead is supplied with coolant by a coolant tube which extends from the distribution chamber in the opposite direction to the other tubes through a slot in the rotor surface under the distribution chamber. This coolant tube extends generally parallel to the longitudinal lead and is connected to the lead at its end adjacent the radial lead to communicate with a passage extending through the longitudinal lead for circulation of the coolant. The coolant tube may also be arranged to circulate the liquid through the radial lead, either before or after flowing through the longitudinal lead. In this way, a relatively simple but effective arrangement is provided for cooling the leads through which the rotor windings are electrically connected to the external circuit so that these leads are capable of carrying the high excitation currents made possible by the liquid cooling of the winding conductors themselves.

BRIEF DESCRIPTION OF THE DRAWINGS

The invention will be more fully understood from the following detailed description, taken in connection with the accompanying drawings, in which:

FIG. 6 is a longitudinal sectional view substantially on the line VI—VI of FIG. 4;

FIG. 7 is a plan view similar to FIG. 5 but showing a further embodiment of the invention; and FIG. 8 is a transverse sectional view substantially on the line VIII—VIII of FIG. 7.

DESCRIPTION OF THE PREFERRED EMBODIMENT

Figure 1:
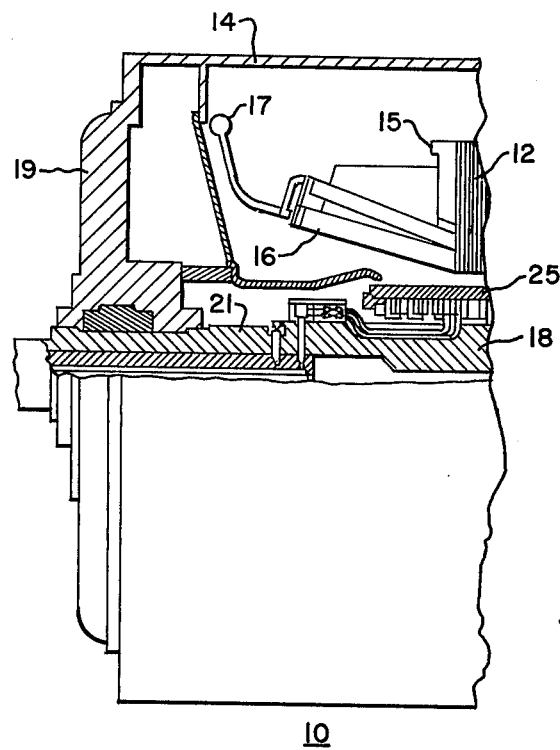
FIG. 1 is a view, partly in longitudinal section and partly in elevation, of a turbine generator embodying the invention.
Figure 3:
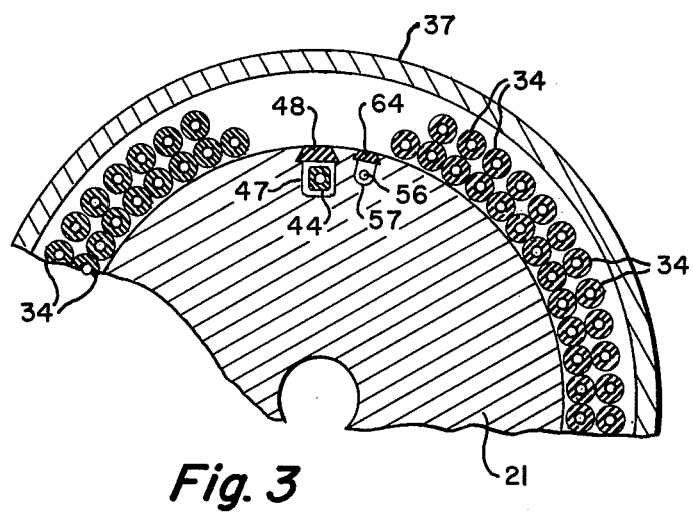
FIG. 3 is a fragmentary transverse sectional view substantially on the line III—III of FIG. 2.

The invention is shown in the drawings embodied in a liquid-cooled rotor for use in a large turbine generator of typical construction, although the invention may, of course, be applied to any desired type of dynamoelectric machine.

Referring first to FIG. 1, there is shown a large generator 10 which has a stator core 12 supported in a substantially gas-tight outer housing 14. The core 12 is of the usual laminated construction having a generally cylindrical bore therethrough, and the laminations are clamped between suitable end plates 15 in the usual manner. The stator core 12 has longitudinal slots in its inner periphery for the reception of a stator winding 16 which may be of any suitable or usual type. The winding 16 is shown as being a liquid-cooled winding and circular inlet and discharge manifolds 17 are provided at opposite ends of the machine for circulating a coolant liquid, such as water, through the coils of the stator winding. The housing 14 is filled with coolant gas, preferably hydrogen, which is circulated through the interior of the housing in the usual manner and suitable baffling of any desired type may be provided in the housing to direct the flow of gas therein. The machine has a rotor 18 which is disposed in the bore of the stator core 12 and supported in end brackets 19 at each end of the housing 14 in bearing assemblies of any desired type which may include gland seals to prevent leakage of gas from the housing.

Figure 2:
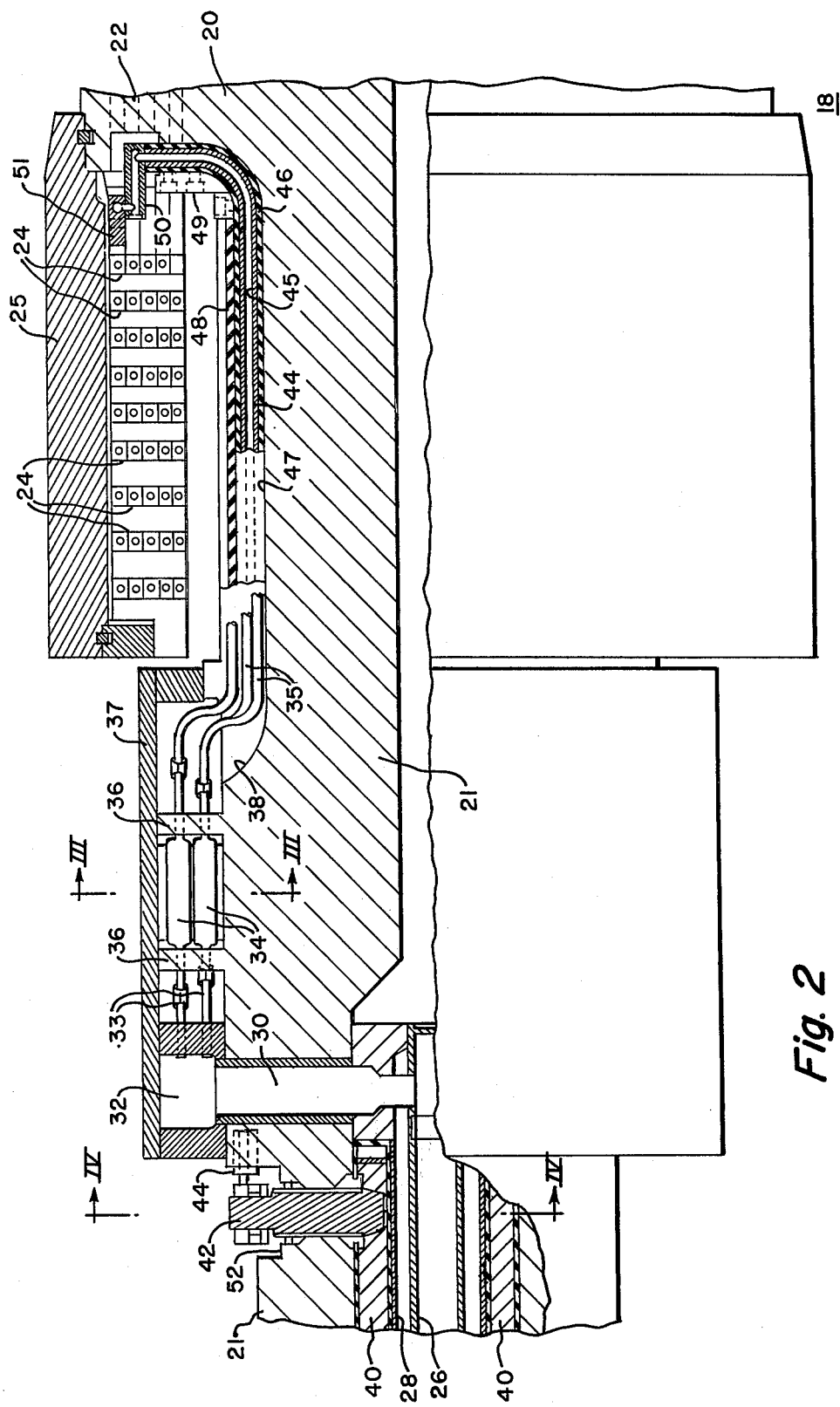
FIG. 2 is a longitudinal sectional view on a larger scale showing one end of the rotor.

As shown more clearly in FIG. 2, the rotor 18 has a body portion 20 and shaft portions 21 which are preferably integral therewith and extend axially from each end of the body portion. The body portion 20 is provided with peripheral slots in the usual manner for reception of a rotor winding 22. The rotor winding 22, which constitutes the field winding of the generator 10, may be arranged in any suitable manner in the slots of the rotor body, usually being arranged in concentric multi-turn coils to form either two or four magnetic poles. The winding 22 is constituted of copper conductors which extend longitudinally through the slots of the rotor body and generally circumferentially in the end turn portions 24 which lie beyond the ends of the body portion 20 of the rotor and which are supported against rotational forces by heavy retaining rings 25 in the usual manner. As can be seen in the end turn portions 24 which are visible in FIG. 2, the winding conductors are hollow, having central passages extending through them through which the coolant liquid can flow from one end of the conductor to the other, although separate tubes or other duct means in good thermal relation to the conductors could, of course, be used. Any suitable or desired type of flow pattern may be utilized for the coolant and any desired type of electrical circuit may be used.

The coolant liquid, which is preferably water, is supplied through the central bore of the shaft 21 and preferably is both introduced and discharged at the same end of the machine. As shown in FIG. 2, two concentric stainless steel tubes 26 and 28 are disposed in the bore of the shaft 21 on the axis thereof, the tube 26 forming a central passage for entrance of water and the tubes 26 and 28 forming an annular passage between them for discharge of water. Coolant water may be supplied to the tubes 26 and 28 and discharged therefrom in any desired manner such as that shown, for example, in the above-mentioned Fidei et al. application.

Coolant water entering the machine through the tube 26 flows through radial passages 30 in the shaft 21 to an annular distribution chamber 32 extending around the shaft on the surface thereof. The passages 30 are preferably lined with stainless steel liners and the chamber 32 is also made of stainless steel, although any suitable corrosion-resistant material could be used. Water connections 33 are provided in the wall of the chamber 32 on the side facing the rotor body 20. The connections 33 are preferably arranged in radial pairs and distributed around the circumference of the chamber 32. The connections 33 are attached to insulating hoses or connectors 34 which, in turn, are connected to stainless steel coolant tubes 35 which convey the water to the rotor winding. The water connections 33 and insulating connectors 34 are supported between integral flanges 36 on the rotor surface, with suitable blocking means, and are retained in position by a ring 37 shrunk or otherwise secured on the rotor to support the hydraulic connections against centrifugal forces.

Water flowing through the tubes 35 to the winding 22 may, if desired, flow through the winding conductors to the opposite end of the rotor and be discharged through an annular chamber, radial passages and shaft bore similar to those illustrated in FIG. 2. In the preferred embodiment, however, the water returns to the same end of the rotor and is discharged through others of the tubes 35 to the annular chamber 32. In this arrangement, the chamber 32 is divided by internal partitions into entrance and discharge portions, as shown in the above-mentioned Fidei et al. application, and the discharged coolant flows through radial passages similar to the passages 30 to the annular discharge passage between the tubes 26 and 28 for discharge from the machine. The coolant tubes 35 are placed in slots 38 in the surface of the rotor shaft 21 and extend longitudinally under the end turn portions 24 of the winding. The tubes are brought radially outward from the slots 38 and connected to the individual winding conductors in any desired manner, a suitable arrangement being shown in another copending application of F. P. Fidei et al, Ser. No. 479,386, filed June 14, 1974, and assigned to the Assignee of the present invention.

As previously indicated, the winding 22 is the field winding of the generator 10 and must be connected to an external source of excitation. For this purpose, axial conductors 40 are disposed in the bore of the rotor shaft 21. The conductors 40 are preferably insulated semitubular copper conductors and extend around the outer water tube 28 so as to obtain some cooling effect from the water flowing in the tube. The conductors 40 extend to the end of the shaft 21 (not shown) where they may be connected to similar conductors of an exciter, or connected to any desired external source of excitation. As shown in FIG. 2, each of the conductors 40 is connected at its other end to a radial lead 42 which is preferably a heavy copper stud threaded into the conductor 40 adjacent the end thereof. The radial lead 42 passes through a suitable opening in the shaft 21 and is insulated therefrom by a suitable insulating covering 43. Electrical connection from the radial leads 42 to the rotor winding 22 is provided by longitudinal leads 44. Although only one of the leads 44 is shown, two such leads, with their associated radial leads 42 and axial conductors 40, are normally provided for the winding, the two leads being preferably disposed diametrically opposite to each other on the rotor shaft.

Figure 5:
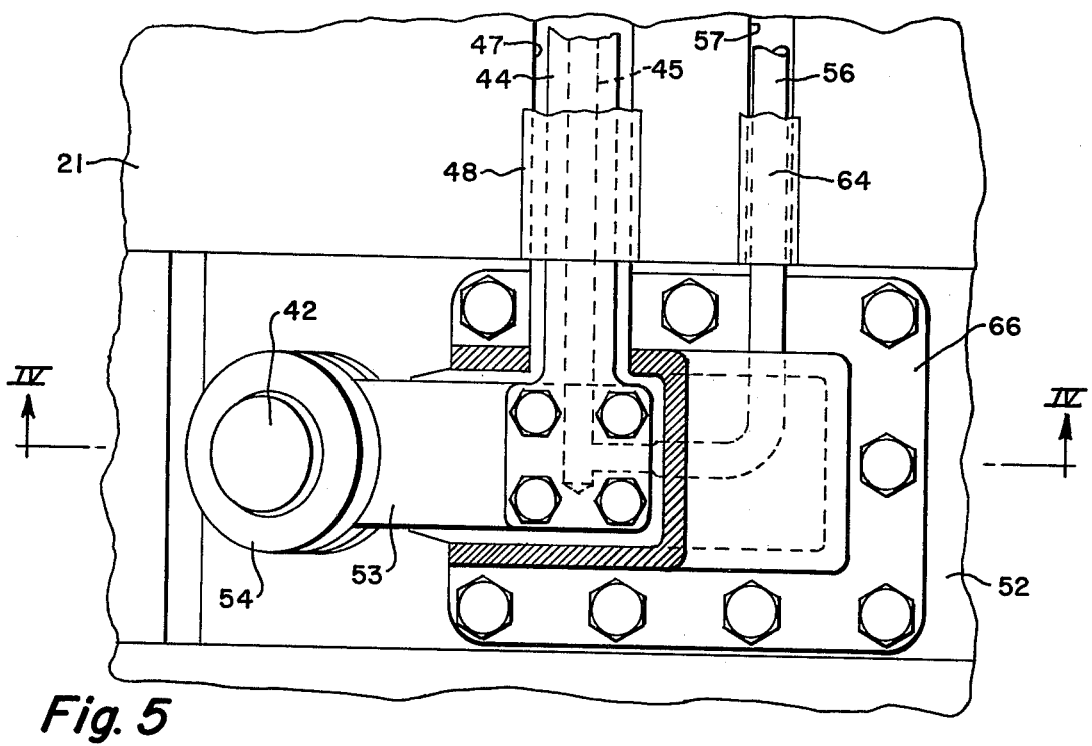
FIG. 5 is a fragmentary plan view of the rotor surface in the region of the radial lead.
Figure 4:
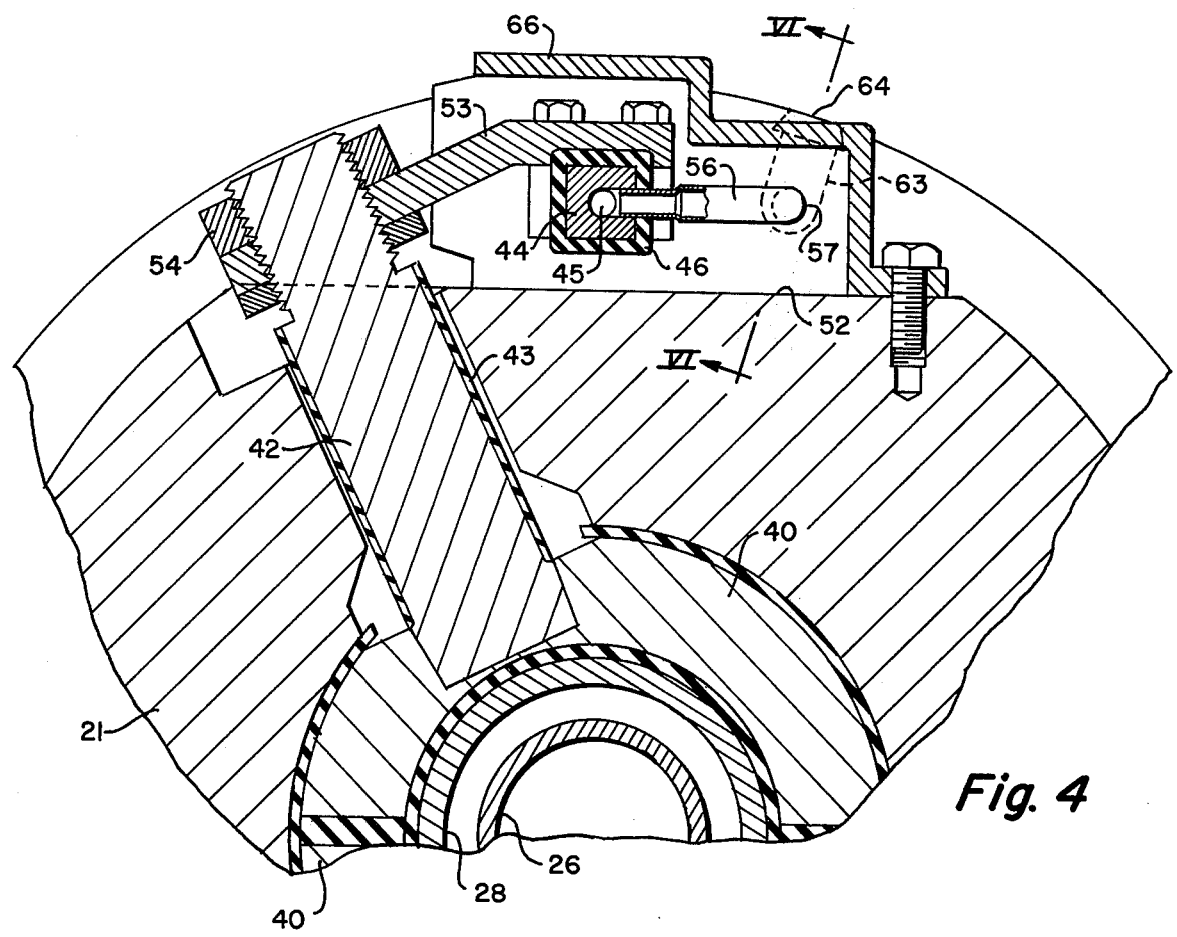
FIG. 4 is a transverse sectional view substantially on the line IV—IV of FIGS. 2 and 5.

Each of the longitudinal leads 44 is preferably a rectangular copper conductor having a central passage 45 extending therethrough for the circulation of coolant water and being suitably insulated as indicated at 46 (FIG. 4). As seen in FIGS. 2 and 5, the lead 44 is disposed in a slot 47 extending longitudinally in the surface of the rotor shaft 21, the slot being closed by a wedge 48 which retains the lead in place. The lead 44 thus extends axially from the vicinity of the radial lead 42 under chamber 32 and under the end turn portions 24 of the winding to the rotor body 20. The conductor 44 is there bent radially outward and extends radially in a recess in the face of the rotor body portion 20, preferably being retained therein by an insulated cleat 49 bolted or otherwise secured to the rotor. The conductor 44 is joined to a connecting member 50 which, in turn, is connected to a lead portion 51 of the first or innermost coil of the winding in the end turn portion 24. The connector 50 and lead 51 have internal passages with which the passage 45 in conductor 44 communicates so that water flowing in the conductor 44 flows into the winding conductors and thus flows through a part of the winding, and ultimately returns to the chamber 32. It will be understood that the lead 51 or the connector 50 may be of the usual U-shaped configuration to permit axial thermal expansion and contraction of the winding conductors without unduly stressing the connections to the conductor 44.

At the other end of the conductor 44, it emerges from the slot 47 into a recess 52 formed by machining a flat surface on the shaft 21 as seen in FIG. 4. The conductor 44 is connected in this recess to the radial lead 42 by a heavy strap connector 53 which is attached to the lead 42 by a nut 54, or in any other suitable manner. Coolant water is supplied to the lead 44 in the recess 52. For this purpose, as shown in FIG. 6, a coolant tube 56 is disposed in a longitudinal slot 57 in the surface of the rotor shaft 21 which extends generally parallel to the slot 47. In order to facilitate installation or removal of the tube 56, a terminal portion 58 of the tube may be provided as a separate member connected to the main part of the tube 56 by a coupling 59 disposed in a recess 60 in the surface of the shaft. The terminal portion 58 extends radially outward from the slot 57 and is connected by a coupling 61 to one of the insulating connectors 34 which supplies it with coolant water from the chamber 32.

The other end of the tube 56 emerges from the slot 57 in the recess 52 in the shaft and is bent approximately 90° and connected to the end of the conductor 44 to communicate with the passage 45 and supply coolant water thereto. The tube 56 is supported in the slot 57 by insulating blocks or supports 63, and the slot is closed by a suitable wedge 64. The ends of the conductor 44 and tube 56 are supported in place by an insulated clamp-type support member 66, bolted or otherwise attached to the shaft 21, which rigidly supports the conductor and tube in place against rotational forces. It will be seen, therefore, that coolant liquid from the chamber 32 is supplied through one of the insulating connectors 34 to flow generally parallel to the conductor 44 and enters the coolant passage of the conductor at its end adjacent the radial lead. The liquid then flows through the conductor 44 and into the coolant flow path of the winding 22. It will be understood that the direction of flow might be opposite to that described above, that is, the liquid might flow from the winding 22 to the conductor 44 and through the tube 56 back to the discharge portion of the chamber 32.

The radial lead 42 is a copper stud of relatively large cross section so that the copper loss per inch of length is relatively smaller than the loss in the lead 44 and special provisions for cooling the radial lead may not always be needed. In machines of high ratings, however, such cooling may be necessary and an arrangement such as that shown in FIGS. 7 and 8 may be utilized. In this arrangement, the longitudinal conductor 44 and the coolant tube 56 may be similar to those described above, and are arranged in slots in the rotor shaft in the same manner except that the tube 56 is disposed on the opposite side of the conductor 44 and extends directly to the radial lead 42. The lead 42 has a central hole 70 formed in it and a cooling tube 72 is disposed in the hole 70. The tube 72 may be generally U-shaped, as shown in FIG. 8, and extends to the bottom of the hole 70. The tube 72 is retained in position by support blocks 74 shaped as shown to substantially fill the hole 70 and firmly hold the tube 72 in position. The blocks 74 are preferably made of aluminum which is a good conductor of heat and which has a higher coefficient of thermal expansion than the copper lead 42, so that tight engagement of the blocks 74 with the lead 42 is insured to provide a good path for heat transfer from the lead to the coolant flowing through the tube 72.

The coolant tube 56, in this embodiment, is connected directly to one end of the U-shaped cooling tube 72 to supply coolant thereto or discharge it therefrom. The conductor 44 has a terminal portion 76 extending at right angles to the conductor, as shown, and connected directly to the radial lead 42. The other end of the tube 72 is connected to the terminal portion 76 of the conductor 44 to communicate with the axial coolant passage therein so that coolant flows between the tube 72 and the longitudinal conductor 44, the flow being in either direction as before. In this way, effective cooling is provided for the radial lead 42 and the coolant tube 56 is connected as an integral part of the coolant circulation system as described above.

It should now be apparent that a system has been provided for effectively cooling the electrical leads for a liquid-cooled rotor winding, including both the longitudinal leads and the radial leads which connect the longitudinal leads to the external circuit. A particular embodiment has been shown in which the coolant liquid for the rotor winding both enters and is discharged at the same end of the rotor. It will be understood, however, that the invention is equally applicable to systems in which the liquid is discharged at the opposite end of the rotor, or to any type of coolant system generally similar to that shown. Thus, the liquid may flow in either direction through the conductor 44 and the tube 56 which may form part of any desired type of coolant system.

What is claimed is:

1. A rotor member for a dynamoelectric machine comprising:
   a shaft portion having a body portion integral therewith, windings having conductors with passages therein for circulation of a liquid coolant carried on said body portion,
   an annular coolant chamber encircling said shaft portion,
   means for supplying liquid coolant to said chamber,
   means for circulating liquid from the side of the chamber facing the body portion through said winding conductor passages,
   a lead for making electrical connection to said windings, said lead comprising an elongated conductor having a passage for circulation of a liquid, said lead extending longitudinally of the shaft portion from the winding to the other side of the coolant chamber,
   connection means on the shaft portion on said other side of the chamber for electrically connecting the lead to an external circuit, said connection means comprising a radial lead extending through the shaft portion, connectors linking said longitudinal lead to said radial lead at the surface of the shaft portion, and a conductor extending longitudinally in a central bore of said shaft portion and electrically connected to said radial lead,
   a coolant tube extending generally parallel to the lead and connected thereto at the end of the lead adjacent said connection means to supply liquid to said passage, said coolant tube extending longitudinally of the shaft portion past the coolant chamber,
   said radial lead being hollow, said coolant tube extending through the hollow radial lead, and means for supporting the tube in place in the radial lead in good heat exchange relation therewith, and
   insulated means on the first-mentioned side of the chamber for supplying liquid to the tube.

2. The rotor of claim 1 wherein said lead and said coolant tube are disposed in parallel slots in the shaft portion of the rotor and extend longitudinally under the coolant chamber.

3. The rotor of claim 1, wherein said conductor extending longitudinally in said central bore of said shaft portion is in a heat exchange relationship with said means for supplying liquid coolant to said chamber.

4. The rotor of claim 2 wherein two leads and associated coolant tubes are disposed diametrically opposite each other on the shaft portion.

5. The rotor of claim 1, wherein said radial lead is disposed on the opposite side of the longitudinal lead from the coolant tube.

* * * * *